(12) United States Patent
Ganga

(10) Patent No.: US 11,711,300 B2
(45) Date of Patent: *Jul. 25, 2023

(54) METHOD AND SYSTEM FOR VIRTUAL PORT COMMUNICATIONS

(71) Applicant: INTEL CORPORATION, Santa Clara, CA (US)

(72) Inventor: Ilango S. Ganga, Cupertino, CA (US)

(73) Assignee: INTEL CORPORATION, Santa Clara, CA (US)

( * ) Notice: Subject to any disclaimer, the term of this patent is extended or adjusted under 35 U.S.C. 154(b) by 218 days.

This patent is subject to a terminal disclaimer.

(21) Appl. No.: 15/396,514

(22) Filed: Dec. 31, 2016

(65) Prior Publication Data

US 2017/0147385 A1 May 25, 2017

Related U.S. Application Data

(63) Continuation of application No. 14/319,570, filed on Jun. 30, 2014, now abandoned, which is a continuation of application No. 11/902,661, filed on Sep. 24, 2007, now Pat. No. 8,798,056.

(51) Int. Cl.
  *H04L 45/745* (2022.01)
  *G06F 9/455* (2018.01)
  *G06F 15/16* (2006.01)
  *H04L 45/00* (2022.01)

(52) U.S. Cl.
  CPC ........ *H04L 45/745* (2013.01); *G06F 9/45558* (2013.01); *G06F 15/16* (2013.01); *H04L 45/66* (2013.01); *G06F 2009/45591* (2013.01); *G06F 2009/45595* (2013.01)

(58) Field of Classification Search
  CPC ....... G06F 9/45558; G06F 2009/45591; G06F 2009/45595; G06F 15/16; H04L 45/745; H04L 45/66
  See application file for complete search history.

(56) References Cited

U.S. PATENT DOCUMENTS

| | | | |
|---|---|---|---|
| 5,278,892 A | 1/1994 | Bolliger et al. | |
| 5,313,454 A | 5/1994 | Bustini et al. | |
| 5,959,990 A | 9/1999 | Frantz et al. | |
| 5,970,066 A | 10/1999 | Lowry et al. | |
| 6,061,349 A * | 5/2000 | Coile ................... | H01R 31/005 370/389 |
| 6,701,361 B1 | 3/2004 | Meier | |
| 7,657,659 B1 | 2/2010 | Lambeth et al. | |
| 8,027,262 B2 | 9/2011 | Kawarai et al. | |
| 8,274,912 B2 | 9/2012 | Wray et al. | |

(Continued)

OTHER PUBLICATIONS

Office Action received for U.S. Appl. No. 15/396,505, dated Mar. 8, 2018, 14 pages.

*Primary Examiner* — Noel R Beharry
*Assistant Examiner* — Wilfred Thomas
(74) *Attorney, Agent, or Firm* — KDW Firm PLLC

(57) ABSTRACT

A method and system may provide virtual port communications. A data frame, containing a destination identifier in a destination field and payload, may be modified by inserting a first virtual machine tag therein. The first virtual machine tag may include a first virtual port identifier for identifying a first logical interface of a first virtual machine on a virtual machine host.

19 Claims, 4 Drawing Sheets

(56) References Cited

U.S. PATENT DOCUMENTS

| | | | |
|---|---|---|---|
| 9,043,792 B1* | 5/2015 | Xu | H04L 12/4666 718/100 |
| 9,575,786 B2* | 2/2017 | Brahmaroutu | G06F 9/45558 |
| 2002/0120720 A1* | 8/2002 | Moir | H04L 12/2856 709/220 |
| 2002/0138628 A1* | 9/2002 | Tingley | H04L 61/10 709/227 |
| 2003/0110268 A1* | 6/2003 | Kermarec | H04L 12/4645 709/227 |
| 2003/0145069 A1* | 7/2003 | Lau | H04L 41/0213 709/220 |
| 2003/0202486 A1 | 10/2003 | Anton, Jr. et al. | |
| 2004/0066780 A1 | 4/2004 | Shankar et al. | |
| 2004/0267866 A1 | 12/2004 | Carollo et al. | |
| 2005/0063397 A1 | 3/2005 | Wu et al. | |
| 2005/0120160 A1 | 6/2005 | Plouffe et al. | |
| 2005/0144327 A1* | 6/2005 | Rabie | H04L 12/4641 709/249 |
| 2005/0163100 A1 | 7/2005 | Orava et al. | |
| 2005/0180345 A1 | 8/2005 | Meier | |
| 2005/0254490 A1 | 11/2005 | Gallatin et al. | |
| 2005/0276263 A1 | 12/2005 | Suetsugu et al. | |
| 2006/0026592 A1* | 2/2006 | Simonen | G06F 9/5044 718/1 |
| 2006/0187853 A1* | 8/2006 | Mititelu | H04L 12/4675 370/254 |
| 2006/0200819 A1* | 9/2006 | Cherkasova | G06F 9/45533 718/1 |
| 2006/0245438 A1 | 11/2006 | Sajassi et al. | |
| 2007/0140263 A1* | 6/2007 | Mitome | H04L 12/4645 370/395.53 |
| 2007/0192518 A1* | 8/2007 | Rupanagunta | G06F 13/124 710/62 |
| 2007/0291752 A1 | 12/2007 | Ben-Dvora et al. | |
| 2008/0031260 A1* | 2/2008 | Polland | H04L 45/502 370/395.53 |
| 2008/0235487 A1* | 9/2008 | Illikkal | G06F 12/126 711/207 |
| 2008/0240122 A1* | 10/2008 | Richardson | H04L 12/66 370/401 |
| 2008/0285437 A1 | 11/2008 | Polland | |
| 2009/0025011 A1* | 1/2009 | Neil | G06F 9/542 719/314 |
| 2009/0232144 A1* | 9/2009 | Lee | H04L 45/745 370/395.31 |
| 2009/0300605 A1* | 12/2009 | Edwards | G06F 9/45558 718/1 |
| 2011/0119748 A1* | 5/2011 | Edwards | G06F 9/45558 726/12 |

* cited by examiner

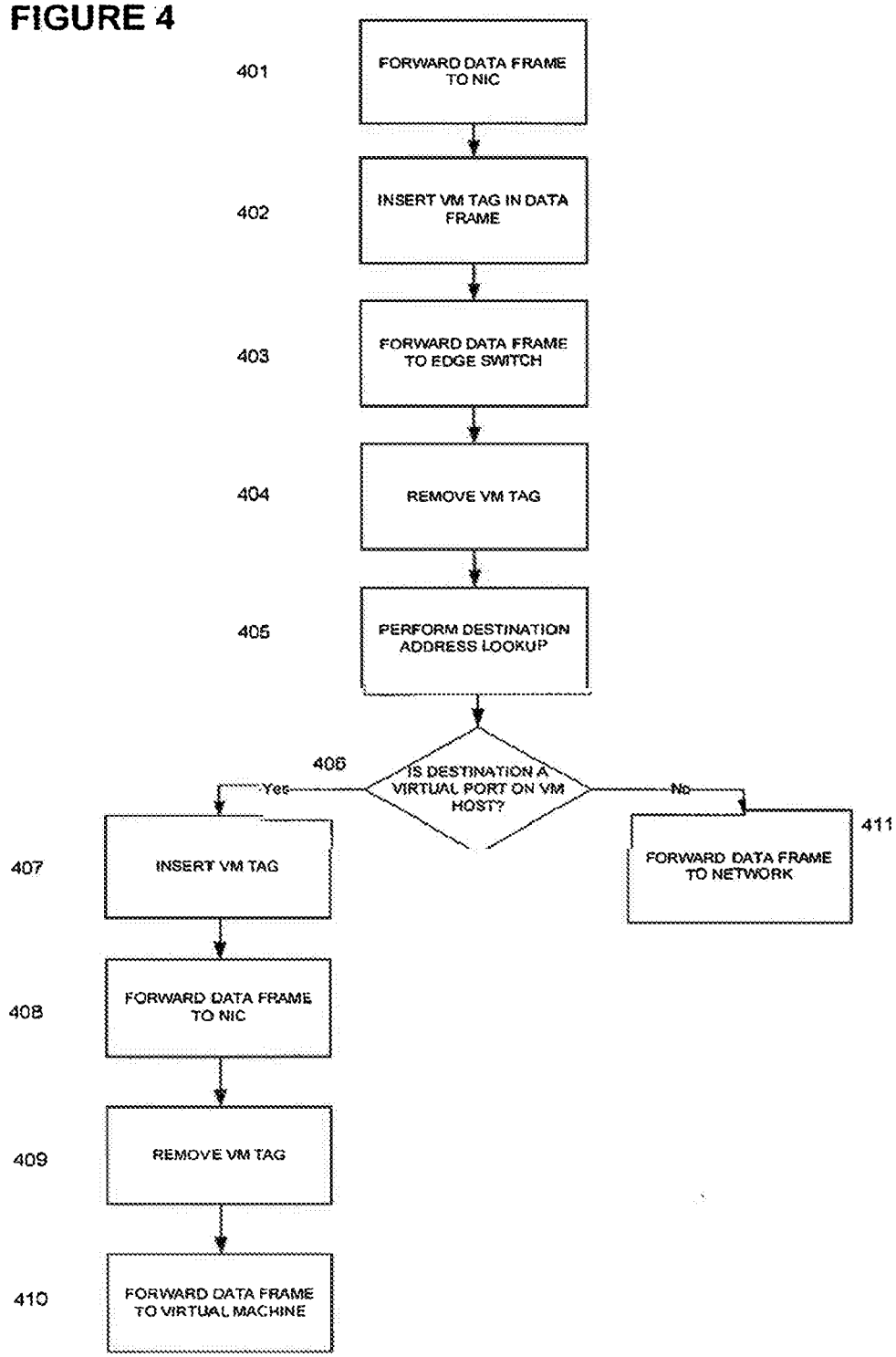

METHOD AND SYSTEM FOR VIRTUAL PORT COMMUNICATIONS

CROSS-REFERENCE TO RELATED APPLICATIONS

This application is a continuation of, claims the benefit of and priority to, previously filed U.S. patent application Ser. No. 14/319,570 entitled "METHOD AND SYSTEM FOR VIRTUAL PORT COMMUNICATIONS" filed on Jun. 30, 2014, which is a continuation of, claims the benefit of and priority to, previously filed U.S. patent application Ser. No. 11/902,661 entitled "METHOD AND SYSTEM FOR VIRTUAL PORT COMMUNICATIONS" filed on Sep. 24, 2007, the subject matter of which are hereby incorporated by reference in their entireties.

BACKGROUND

A virtual machine (VM) may be or include a framework or environment created by for example a virtual machine monitor (VMM) on a host system. A VMM may provide facilities or resources on the host system for an application, firmware or guest operating system that may execute or run in the VM. This execution may require communication with one or more other entities including for example another VM hosted on the same computing platform or a separate entity linked to the host computing platform by a network connection.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

FIG. 4 is a flowchart of a method for outbound virtual port communications according to an embodiment of the invention.

Figure 1:
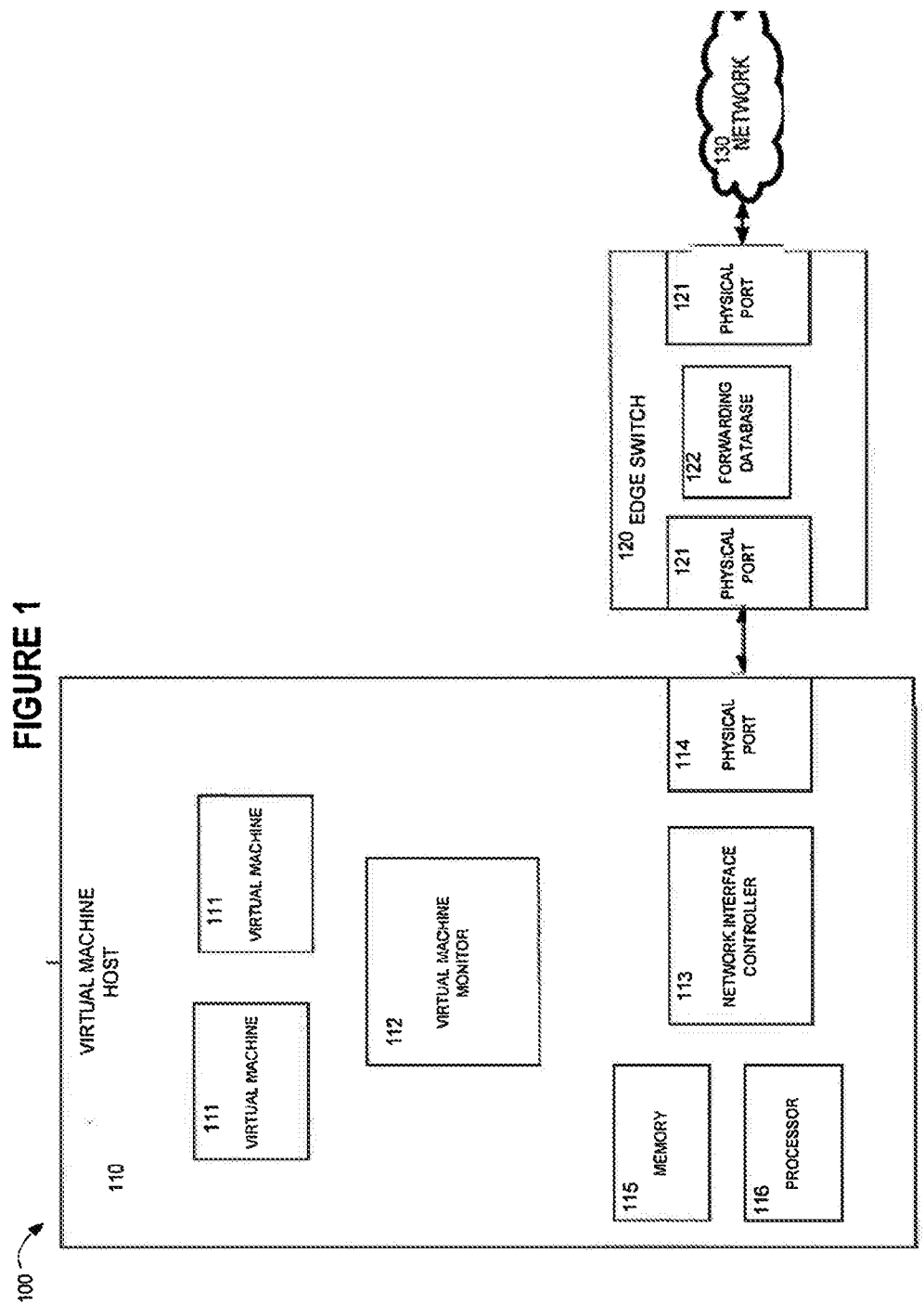
FIG. 1 is a schematic illustration of a virtual machine host and edge switch system according to an embodiment of the invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

Embodiments of the invention may provide a method and system for virtual port communications. In one embodiment, a data frame, containing a destination identifier in a destination field and a payload, may be modified by inserting a first virtual machine tag therein. The first virtual machine tag may include a first virtual port identifier for identifying a first logical interface of a first virtual machine on a virtual machine host.

Reference is now made to FIG. 1, a schematic illustration of a VM host and edge switch system 100 capable of implementing virtual port communications according to an embodiment of the invention. Although the invention is not limited in this respect, VM host and edge switch system 100 may include a VM host 110 and an edge switch 120 that may be connected to network 130. In some embodiments, VM host 110 may include or may be, for example, a personal computer, a desktop computer, a mobile computer, a laptop computer, a notebook computer, a terminal, a workstation, a server computer, a personal digital assistant (PDA) device, a network device, or other suitable computing device capable of hosting a VM.

VM host 110 may include for example a virtual machine monitor (VMM) 112, one or more VMs 111, a network interface controller (NIC) 113, a physical port 114, a memory unit 115, and a processor 116 in accordance with embodiments of the invention. Edge switch 120 may include for example one or more physical ports 121 and a forwarding database 122.

VM 111 may include, for example, one or more environments able to emulate, simulate, virtualize, execute, directly execute, or invoke a hardware component, a software component, an operating system (OS), an application, a code, a set of instructions, or the like. VM 111 may be implemented using hardware components and/or software components. For example, VM 111 may be implemented as a software application executed in a component of or in VM host 110 or as a hardware component integrated within VM host 110 or as a hardware component of some other hardware component of VM host 110. Although FIG. 1 shows a single VM 111 component, the present invention is not limited in this regard, and VM host 110 may be capable of hosting a plurality of VM 111's which, in some embodiments, may operate substantially in parallel. In some embodiments VM 111 may simulate one or more components of a computing platform with access to a network, another network entity, or other computing device either virtualized or not. VM 111 may have associated with it a unique media access control (MAC) address or other address(es) or name(s) that may uniquely identify VM 111. The MAC address may be assigned to VM 111 for example in accordance with one more Institute of Electronic and Electrical Engineers (IEEE) standards.

VMM 112 may create and manage one or more VM's such as for example VM 111 and allocate resources within for example VM host 110 to support one or more VM 111's. VMM 112 may be implemented using hardware components and/or software components. For example, VMM 112 may be implemented as a software application executed in a component of or in VM host 110 or as a hardware component integrated within VM host 110 or as a hardware component of some other hardware component of VM host 110. VMM 112 may also be referred to for example as virtualization software, a hypervisor, or an I/O partition depending on the virtualization architecture or models. VMM 112 may include for example one or more software and/or hardware components able to create VM 111, set or modify a property of VM 111, configure VM 111, monitor the operation of VM 111, and/or control the operation of VM 111. In some embodiments, VMM 112 may have, for example, system-level privileges, administrator-level privileges, and/or root-level privileges, and may control the operation of VM 112 and/or other components of VM host 110 such as for example NIC 113. VMM 112 may be able use, directly and/or indirectly, one or more resources or components of VM host 110 such as for example NIC 113.

NIC 113 may operate as a physical layer (e.g., Open System Interconnection (OSI) layer 1) and a data layer (e.g., OSI layer 2) component providing a physical access networking medium and low-level addressing such as for example through MAC addresses. NIC 113 may be implemented as a software application executed in a component of or in VM host 110 or a hardware component integrated within VM host 110 or as a hardware component of some other hardware component of VM host 110. In some embodiments, NIC 113 may also be implemented as for example an intelligent NIC and may include a processor and memory. NIC 113 may for example be virtualized. In some embodiments, NIC 113 may operate using for example Ethernet technology and may utilize MAC addressing in accordance with one more IEEE standards.

NIC 113 may communicate with devices external to VM host 110 via for example physical port 114. Physical port 114 may be a component of VM host 110 that may act as an interface between VM host 110 and any external device or network. In some embodiments, physical port 114 may be an internal component of NIC 113.

In some embodiments, VM 111 may communicate with other network entities such as for example other VM 111's hosted on VM host 110 or other computing platforms or network entities outside of VM host 110. In these instances, VM 111 may communicate with these network entities through NIC 113. For such network communications, each instance of a VM 111 in VM host 110 may be assigned a logical network interface referred to herein as a "virtual port" controllable by NIC 113. The number of virtual ports in a NIC 113 may be equal to the number of VM 111's assigned to NIC 113. In some embodiments, VM host 110 may include more than one VM 111 and more than one NIC 113 with the virtual port assignments of each VM 111 allocated among the number of NIC 113's. Furthermore, in some embodiments one or more VM 111's may have more than one logical network interface and correspondingly more than one virtual port for assignment to the one or more NIC(s) 113 present.

For embodiments in which NIC 113 may be virtualized, NIC 113 may present or indicate a number of virtual interfaces or virtual functions to VMM 112 such that each virtual port is associated with a virtual interface. VMM 112 may assign each virtual interface to a VM 111. In some embodiments, a direct assignment or pass through model may be used to assign each virtual interface directly to a VM 111. Alternatively, an emulated model may be used to assign virtual ports to different VMs 111 or different queues in NIC 113. In a multi-queue NIC model, for example, each queue or set of queues may be associated with a virtual port. The associated queues may then be assigned to the respective VMs 111.

Although FIG. 1 shows VMM 112, VM 111, and NIC 113 as separate components of VM host 110, the present invention is not limited in this regard. VMM 112, VM 111, and NIC 113 may be implemented, for example, as software components stored within memory 115 of VM host 110, as a controller and/or processors and/or hardware units integrated within or coupled to one or more processors such as processor 116 within VM host 110, or the like.

Memory 115 may include, for example, one or more memories such as a random access memory (RAM), a read only memory (ROM), a dynamic RAM (DRAM), a synchronous DRAM (SD-RAM), a Flash memory, a volatile memory, a non-volatile memory, a cache memory, a buffer, a short term memory unit, a long term memory unit, or other suitable memory units for storing data and or software components such as VM 111, VMM 112, and/or NIC 113.

Processor 116 may be or include for example a central processing unit (CPU), a digital signal processor (DSP), a microprocessor, a controller, a chip, a microchip, or any suitable multi-purpose or specific processor or controller. In some embodiments, for example, processor 111 may perform calculation operations or processing operations which may be used in the operation of VM 111, VMM 112, and/or NIC 113.

In some embodiments, NIC 113 may be connected to edge switch 120. Edge switch 120 may be a router, switch, routing switch, data center interconnect, or any local area network (LAN), metropolitan area network (MAN), wide area network (WAN), or other network access device for providing an entry point or access to a LAN, MAN, WAN or other such network such as for example network 130 external to VM 111. Correspondingly, network 130 may be a LAN, MAN, WAN or other similar network with communications links between two or more network nodes or stations such as for example VM 111 or VM host 110.

Physical port 121 may be a component of edge switch 120 that may act as an interface between edge switch 120 and any network or external device such as for example VM host 110 and/or network 130. In some embodiments of the present invention, edge switch 120 may be configured to have one or more virtual ports for each physical port 121 connected to physical port 114 on VM host 110. Because virtual ports may be configured on both ends of a link such as e.g. between VM host 110 and edge switch 120, each of the virtual ports on edge switch 120 may be connected logically to a VM 111 via NIC 113 and physical port 114.

In some embodiments, edge switch 120 may operate with the same communications technology and protocols as VM host 120 such as for example using Ethernet technology and may also utilize MAC addressing. To distinguish among the various virtual ports each associated with a VM 111, each virtual port may be assigned a virtual port identifier (VPID). The VPID may facilitate routing of traffic to and from the VM 111's. In some embodiments, the VPID may be associated with an IP or network address even though the VPID may be associated with a MAC address for layer 2 forwarding.

In some embodiments, a VPID may be inserted into one or more data frames or packets used by VM 111's for communications with external devices to act as a source and/or destination identifier. These data frames may be carried between VM host 110 and edge switch 120. In some embodiments, these data frames may be formatted according to a standard format such as for example Ethernet framing. Other data frame formats may also be used.

Figures 2A, 2B:
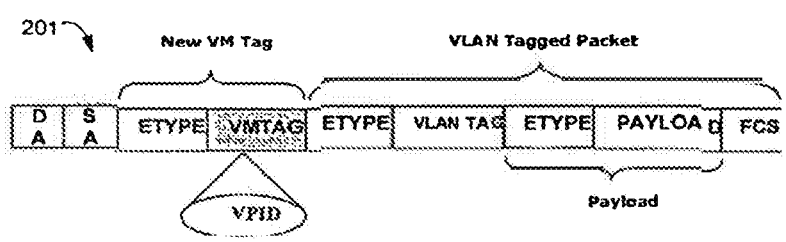
FIGS. 2A and 2B are representative illustrations of a data frame format and a database according to an embodiment of the invention.

Reference is now made to FIG. 2A which shows a data frame 201 according to an embodiment of the invention. A data frame in the format of data frame 201 may include a destination address (DA), a source address (SA), a payload, a VM tag, and a VLAN tag in accordance with IEEE standards 802.3, 802.1, 802.1Q or other such standard, although the invention is not limited in this respect. For example, the Ethernet frame used for communication between VM 111 and edge switch 120 may contain a VM tag without a VLAN tag. In some embodiments, the DA and the SA may include the MAC addresses of the corresponding destination and source network entities. The payload and VLAN tag and its associated Ethertype (Etype) field may be referred to as a VLAN tagged packet. For communications according to some embodiments of the invention, the VM tag of the data frame may be inserted into the data frame such as the Ethernet data frame and may include for example an Ethertype field and a VMTAG field. In some embodiments, the VM tag may be for example 32 bits long and may include a 16 bit Ethertype field and a 16 bit VMTAG field. Other fields may also be included in the VM tag. The Ethertype field of the VM tag may indicate that the Ethernet frame is VM tagged, while the VMTAG field may carry the VPID of the virtual port associated with the data frame. In some embodiments, for outbound traffic from VM 111, the VMTAG field may include a source identifier of VM 111, while for traffic inbound to VM 111, the VMTAG field may include a destination identifier.

Although the frame format of data frame 201 may be one scheme for identifying virtual ports when communicating between a NIC 113 and an edge switch 120, it is to be understood that other framing formats may be used to identify virtual ports to both NIC 113 and edge switch 120. For example, an alternative special field may be established in an Ethernet frame that carries a unique identifier for a virtual port.

In some embodiments, NIC 113 and edge switch 120 may each be configured to receive and read data frames that include a VM tag such as that shown in FIG. 2A. For outbound traffic, VM 111 may send to NIC 113 an Ethernet frame according to for example IEEE 802.1Q. NIC 113 may modify the Ethernet frame by inserting a VM tag corresponding to the virtual port assignment of VM 111 into the Ethernet frame and forward the packet to edge switch 120 via physical port 114. Alternatively, VMM 112 or VMM 111 may insert the VM tag into the Ethernet frame possibly allowing inclusion of a standard NIC interface. Once the modified Ethernet frame is received via physical port 121, edge switch 120 may remove the VM tag before routing the Ethernet frame to its destination. In some embodiments, edge switch may use information in the VM tag in forwarding decisions, applying network access control lists for security, quality of service decisions, and/or for collecting statistics for network management purposes.

In some embodiments edge switch 120 may be implemented as a stackable switch, e.g., as multiple switches stacked to operate as a single logical entity. Switches in the stack may forward the frames with the VM tag included until the frame reaches the last switch in the stack which may strip the VM tag before forwarding the frame to the network.

For inbound data frames, edge switch 120 may read a MAC address in the DA field of an Ethernet frame. Edge switch may use this MAC address to determine whether the destination of the data frame is VM 111 by performing an address lookup in forwarding database 122. Forwarding database 122 may be any tabular database or functionally similar software application known in the art, or another suitable database or table, for storing network addresses and related information in a searchable or retrievable form.

Reference is now made to FIG. 2B which is a representative illustration of a forwarding database 202 according to an embodiment of the invention. In some embodiments, forwarding database 202 may be the same as or have the same functions and/or format as forwarding database 122. Although the invention is not limited in this respect, each entry in forwarding database 202 may represent a VM 111 hosted in VM host 110 and may be of a format having a number of fields for example as follows:

{VLAN,*MAC*_Address}→{Physical Port_*Num*, VPID} where VLAN may be a network identifier, MAC_Address may be the MAC address of the respective VM 111, Physical Port_Num may be the physical port number through which the VM 111 communicates, and VPID may be the virtual port identifier corresponding to the VM 111. Additional and/or alternative data fields may be included in the entries of forwarding database 202.

If edge switch 120 determines from an address lookup that VM 111 is the destination of an inbound data frame, then edge switch 120 may modify the data frame by inserting the VM tag corresponding to VM 111's VPID into the data frame. Edge switch may then forward the modified data frame to NIC 113 via physical port 114. NIC 113 may remove the VM tag and forward the data frame to VM 111. Alternatively, in some embodiments VMM 112 may remove the VM tag or VM 111 may be capable of receiving the data frame with the VM tag.

In some embodiments, edge switch 120 may also forward data frames for communication among virtual entities having virtual ports on VM host 110 such as for example two or more VM 111's. NIC 113 may forward an outbound data frame from for example one VM 111 to edge switch 120. After stripping the existing VM Tag from the data frame, edge switch 120 may perform an address lookup on the MAC address in the DA field using forwarding database 122. If the destination's MAC address corresponds to a second VM 111 or other entity in VM host 110 having a VPID, edge switch 120 may insert a new VM Tag with the corresponding VPID into the data frame and forward the modified data frame back to NIC 113 which may remove the new VM Tag before forwarding the data frame on to the destination VM 111.

Performing the routing of all traffic to and from VM 111 at edge switch 120 with the invented virtual port communications may have several advantages. Some embodiments of the present invention may eliminate the need for any virtualized switching associated with any virtualized entities such as VM 111 which may not be visible to some or all other parts of a network's infrastructure Eliminating virtualized switching may enable consistent application of network traffic and security policies among virtual entities such as for example VM 111 and other entities on a network by bringing awareness of the virtual machine infrastructure out to the edge switch. Network and security policies may then be applied in the edge switch independently of the virtualization. In some embodiments, it may be possible to have all switches of a network operate in a single management domain, easing the burden of network management and lowering maintenance costs. Other or different benefits may occur.

The virtual port communications may also allow data frame forwarding between virtual ports on the same physical port consistent with the IEED 802.1D Bridging standard ("IEEE Standard for Local and Metropolitan Area Networks, Media Access Control (MAC) Bridges", Jun. 9, 2004). Typically, in 802.1D bridging a frame may not be sent back to the port that sent the frame because packet duplication may result. However, incorporation of virtual port communications technology in a VM host and associated edge switch may avoid this by assigning different virtual ports to different VMs on a given physical port.

In some embodiments, forwarding database 122 may be configured to enable edge switch 120 to handle multicast and broadcast forwarding to virtual ports. Although not shown in FIG. 2B, for a multicast destination having a particular MAC address to be looked up, additional fields corresponding to the various VPIDs of for example various VM 111's may be added to the database entry. A multicast data frame or packet may then be forwarded to all member virtual ports in the same VLAN with the multicast data frame replicated once for every VPID and then sent to the respective member virtual ports and corresponding VMs. In one embodiment, removing and forwarding may be repeated for each of the members of a group such as a multicast group. Alternatively, multicasting replication may also be performed at NIC 113 by including a field in the VM tag to indicate that the data frame is a multicast frame. In some embodiments, the implementation for broadcast forwarding may be the same as or similar to that for multicast forwarding.

Figure 3:
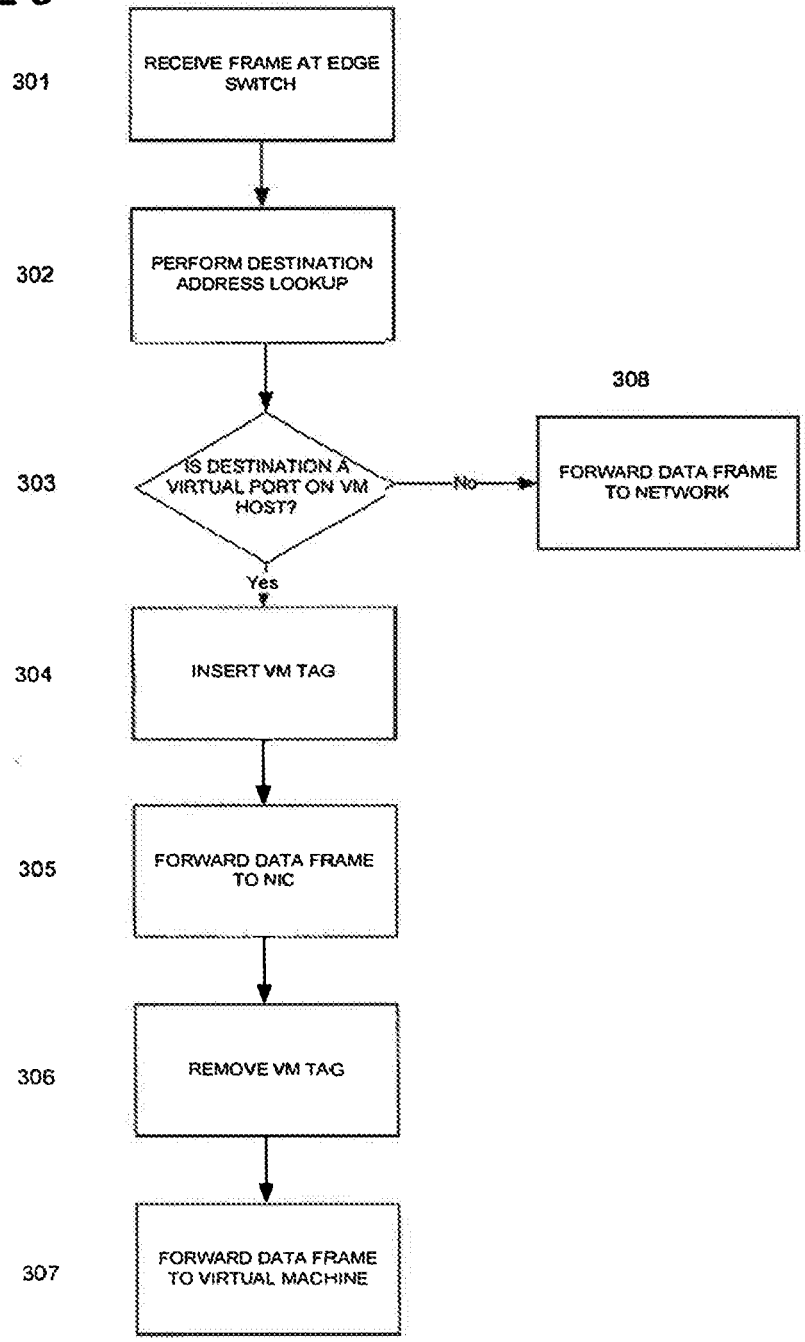
FIG. 3 is a flowchart of a method for inbound virtual port communications according to an embodiment of the invention.

Reference is now made to FIG. 3 which is a flowchart of a method for inbound virtual port communications according to an embodiment of the invention. Embodiments of the method may be used by, or may be implemented by, for example, VM host and edge switch system 100 of FIG. 1 or by other suitable wired and/or wireless communication devices, stations, nodes, systems and/or networks. Embodiments of the method may also use the frame format and forwarding database structure of FIG. 2 or other suitable data frame formats and forwarding database structures.

As indicated at operation 301, an edge switch such as edge switch 120 configured in accordance with an embodiment of the invention may receive a data frame from for example network 130. The data frame may be in an Ethernet frame format or other frame format known in the art with a DA field containing a MAC address or other destination identifier. Edge switch 120 may perform in operation 302 a destination lookup of the MAC address in a forwarding database such as database 122. In operation 303 the edge switch may determine if the MAC address of the DA field matches the MAC address corresponding to a VPID of a virtual machine such as for example VM 111 or other virtual network entity on or internal to VM host 110.

If the MAC address of the DA field does match the MAC address of VM 111, edge switch 120 may modify the data frame by inserting into the data frame a VM tag containing the VPID corresponding to VM 111 (operation 304). Edge switch 120 may then forward the modified data frame to NIC 113 of VM host 110 (operation 305).

In operation 306, NIC 113 may remove the VM tag in the modified data frame received from edge switch 120, and may forward the data frame on to VM 111 (operation 307).

If the MAC address of the DA field does not match the MAC address of VM 111, the destination for the data frame may not be a virtual entity on VM host 110. Edge switch 120 may forward the data frame on to another network entity on for example network 130 such as for example other non-virtualized hosts or network nodes (operation 308).

Other operations or series of operations may be used.

Reference is now made to FIG. 4 which is a flowchart of a method for outbound virtual port communications according to an embodiment of the invention. Embodiments of the method may be used by, or may be implemented by, for example, VM host and edge switch system 100 of FIG. 1 or by other suitable wired and/or wireless communication devices, stations, nodes, systems and/or networks. Embodiments of the method may also use the frame format and forwarding database structure of FIG. 2 or other suitable data frame formats and forwarding database structures.

In operation 401, a VM or virtualized entity on a VM host such as for example VM 111 on VM host 110 forwards a data frame to NIC 113. NIC 113 may modify the data frame by inserting into the data frame a VM Tag containing a VPID corresponding to the virtual port associated with VM 111 (operation 402) and may forward the modified data frame to an edge switch such as for example edge switch 120 (operation 403).

In operation 404, edge switch 120 may remove the VM Tag in the modified data frame received from NIC 113. Operations 405 and 406 may proceed as operations 302 and 303 of FIG. 3 in that edge switch 120 may perform a destination lookup of the MAC address in a forwarding database and determine if the MAC address corresponds to a VPID of a virtual machine on VM host 110.

If the MAC address of the DA field does match the MAC address of a virtual entity on VM host 110 such as for example a second VM 111, the communication may be internal to VM host 110. Routing such internal communications through edge switch 120 may allow network policies such as access control or security to be consistently maintained for communications internal to and external to VM host 110. Edge switch 120 may modify the data frame by inserting into the data frame a VM tag containing the VPID corresponding to the second VM 111 (operation 407). Operations 408-410 may proceed correspondingly as operations 305-307 of FIG. 3.

If the MAC address of the DA field does not match the MAC address of VM 111, the destination for the data frame may not be a virtual entity on VM host 110. Edge switch 120 may forward the data frame on to another network entity on for example network 130 (operation 411). In some embodiments, multiple VM hosts 110 may be connected to edge switch 120. In these instances, forwarding the data frame to a second VM host 110 may proceed according to operations 305-307.

Other operations or series of operations may be used.

Management of virtual ports may be handled by for example a fixed configuration or an auto configuration such as by advertisement or discovery when a VM host such as VM host 110 is connected to a virtualized edge switch such as edge switch 120. When a VM host is first connected to an edge switch, both nodes or ends of the link may send advertisement and/or discovery messages to identify their respective peer capabilities. If both nodes are capable of virtual port communications, then other parameters may be exchanged. These parameters may include for example the number of virtual ports, range for VPID's, and other pertinent virtual port communications parameters. Control messages may be exchanged periodically among nodes. If a change in virtualized network configuration occurs such as for example the addition of a new VM, additional control messages may be sent to for example reconfigure the nodes, configure the new virtual port, etc.

In some embodiments, all network policies and privileges belonging to a VM such as VM 111 may be preserved when moving the VM from one physical host such as VM host 110 to another host on a network because embodiments of the invention enable network policies to be applied in network switches based on VM identity not physical presence. The edge switches of the network may thus re-learn the MAC address of the new virtual port/physical port combination.

In some embodiments, virtual port communications may also be used for legacy hardware NICs. For these instances, virtual ports may be implemented in software in for example an Input/Output (IO) partition and/or in VMM 112. A virtual switch in the IO partition may not be required, and instead may be replace by a software multiplexer/demultiplexer that may be lighter than a virtual switch.

While the invention has been described with respect to a limited number of embodiments, it will be appreciated that many variations, modifications and other applications of the invention may be made. Embodiments of the present invention may include other apparatuses for performing the operations herein. Such apparatuses may integrate the elements discussed, or may comprise alternative components to carry out the same purpose. It will be appreciated by persons skilled in the art that the appended claims are intended to cover all such modifications and changes as fall within the true spirit of the invention.

What is claimed is:

1. An apparatus, comprising:
   a memory; and
   processing circuitry coupled to the memory, the processing circuitry to:
      access an Ethernet frame received from a first virtual machine (VM) via a virtual interface assigned to the first VM by a virtual machine monitor (VMM), the first VM to be executed on an external device;
      identify a port associated with the virtual interface;
      insert a tag into the Ethernet frame, the tag to comprise a virtual port identifier associated with the port, an EtherType to indicate that the Ethernet frame is tagged with the virtual port identifier, and a 16-bit field indicating the EtherType; and
      forward the Ethernet frame to a second VM to be executed on the external device via a physical port.

2. The apparatus of claim 1, the Ethernet frame to include a field containing an indicator associated with a destination of the Ethernet frame, and the second VM to comprise the destination of the Ethernet frame.

3. The apparatus of claim 2, the indicator to comprise a media access control (MAC) address.

4. The apparatus of claim 1, the processing circuitry to:
   identify a second virtual interface based on a tag comprised in a second Ethernet frame received via the physical port; and
   forward the second Ethernet frame to the second VM via the second virtual interface.

5. The apparatus of claim 4, the processing circuitry to remove the tag from the second Ethernet frame.

6. The apparatus of claim 1, the processing circuitry to execute the VMM to assign the virtual interface to the first VM.

7. At least one non-transitory computer-readable storage medium comprising a set of instructions that, in response to being executed on processing circuitry of a computing device, cause the computing device to:
   access an Ethernet frame received from a first virtual machine (VM) via a virtual interface assigned to the first VM by a virtual machine monitor (VMM), the first VM to be executed on an external device;
   identify a port associated with the virtual interface;
   insert a tag into the Ethernet frame, the tag to comprise a virtual port identifier associated with the port, an EtherType to indicate that the Ethernet frame is tagged with the virtual port identifier, and a 16-bit field indicating the EtherType; and
   forward the Ethernet frame to a second VM to be executed on the external device via a physical port.

8. The at least one non-transitory computer-readable storage medium of claim 7, the Ethernet frame to include a field containing an indicator associated with a destination of the Ethernet frame, and the second VM to comprise the destination of the Ethernet frame.

9. The at least one non-transitory computer-readable storage medium of claim 8, the indicator to comprise a media access control (MAC) address.

10. The at least one non-transitory computer-readable storage medium of claim 7, comprising instructions that, in response to being executed on the processing circuitry of the computing device, cause the computing device to:
    identify a second virtual interface based on a tag comprised in a second Ethernet frame received via the physical port; and
    forward the second Ethernet frame to the second VM via the second virtual interface.

11. The at least one non-transitory computer-readable storage medium of claim 10, comprising instructions that, in response to being executed on the processing circuitry of the computing device, cause the computing device to remove the tag from the second Ethernet frame.

12. A method, comprising:
    accessing, by processing circuitry, an Ethernet frame received from a first virtual machine (VM) via a virtual interface assigned to the first VM by a virtual machine monitor (VMM), the first VM to be executed on an external device;
    identifying a port associated with the virtual interface;
    inserting a tag into the Ethernet frame, the tag to comprise a virtual port identifier associated with the port, an EtherType to indicate that the Ethernet frame is tagged with the virtual port identifier, and a 16-bit field indicating the EtherType; and
    forwarding the Ethernet frame to a second VM to be executed on the external device via a physical port.

13. The method of claim 12, the Ethernet frame to include a field containing an indicator associated with a destination of the Ethernet frame, and the second VM to comprise the destination of the Ethernet frame.

14. The method of claim 13, the indicator to comprise a media access control (MAC) address.

15. The method of claim 12, comprising:
    identifying a second virtual interface based on a tag comprised in a second Ethernet frame received via the physical port; and forwarding the second Ethernet frame to the second VM via the second virtual interface.

16. The method of claim 15, comprising removing the tag from the second Ethernet frame.

17. The apparatus of claim 1, wherein the Ethernet frame is to be received from the first virtual machine via the physical port.

18. The at least one non-transitory computer-readable storage medium of claim 7, wherein the Ethernet frame is to be received from the first virtual machine via the physical port.

19. The method of claim 12, wherein the Ethernet frame is to be received from the first virtual machine via the physical port.

* * * * *